March 5, 1935.  W. J. MERRIGAN  1,993,219
CIRCULAR SAW
Filed July 12, 1933   4 Sheets-Sheet 1

INVENTOR
W. J. Merrigan
By Hazard & Miller
ATTORNEYS

March 5, 1935.  W. J. MERRIGAN  1,993,219
CIRCULAR SAW
Filed July 12, 1933  4 Sheets-Sheet 2

INVENTOR
W. J. Merrigan
BY Hazard & Miller
ATTORNEYS

March 5, 1935.  W. J. MERRIGAN  1,993,219
CIRCULAR SAW
Filed July 12, 1933   4 Sheets-Sheet 3

INVENTOR
W. J. MERRIGAN
BY
Hazard & Miller
ATTORNEYS

March 5, 1935.  W. J. MERRIGAN  1,993,219
CIRCULAR SAW
Filed July 12, 1933  4 Sheets-Sheet 4

INVENTOR
W. J. MERRIGAN
By Hazard and Miller
ATTORNEYS

Patented Mar. 5, 1935

1,993,219

UNITED STATES PATENT OFFICE 1,993,219

CIRCULAR SAW

William J. Merrigan, Los Angeles, Calif., assignor to Herberts Machinery Company, Ltd., Los Angeles, Calif., a corporation of California Application July 12, 1933, Serial No. 680,086

8 Claims. (Cl. 143—174)

This invention relates to improvements in circular saws.

An object of the invention is to provide an improved construction of circular saw wherein there is a table, a rotatable spindle carrying the circular saw, and a novel, simple and advantageous means for effecting a raising and lowering of the saw with respect to the table top. Heretofore general practice has been to provide the bearing for the spindle with a single pivoted arm so that on moving the arm about its point of pivot the saw is projected through or lowered through the table top. The use of a single arm in conjunction with the raising and lowering means is disadvantageous in that loose play of the parts enables the bearing for the spindle to vibrate and also to move out of its intended plane of movement, with the result that not infrequently the saw is moved sufficiently so as to engage the sides of the slot in the table top. In the present construction a double arm is used to pivotally mount the bearing. This prevents distortion of the parts and the movement of the bearing and of the saw out of their interded planes of movement. The construction also enables the use of a simple and advantageous means for effecting a raising and lowering of the saw and also of a means for locking the saw in adjusted position.

Another object of the invention is to provide a novel, simple and advantageous construction for mounting the table top on its base so as to permit the tilting of the table top with respect to the base.

A further object of the invention is to provide a novel and simple fence construction which is used in conjunction with the table top as a guide in feeding material to be cut to the saw. In a fence construction it is highly desirable that the fence be capable of sliding freely and easily across the table top to adjust the width of material to be cut and on assuming the adjusted position to be able to tighten the fence in position, which will be perfectly parallel to the plane of the saw. The improved fence is so designed as to accomplish the above objects.

A further object of the invention is to provide a novel and simple guard construction for the saw which is so designed as to be automatically lifted by the material being fed to the saw and which is so arranged that it is impossible to tilt the guard with respect to the arm on which it is mounted so that the guard cannot engage the saw at any normal height to which the saw is projected through the table.

With the foregoing and other objects in view, which will be made manifest in the following detailed description, and specifically pointed out in the appended claims, reference is had to the accompanying drawings for an illustrative embodiment of the invention, wherein:

Figure 1:
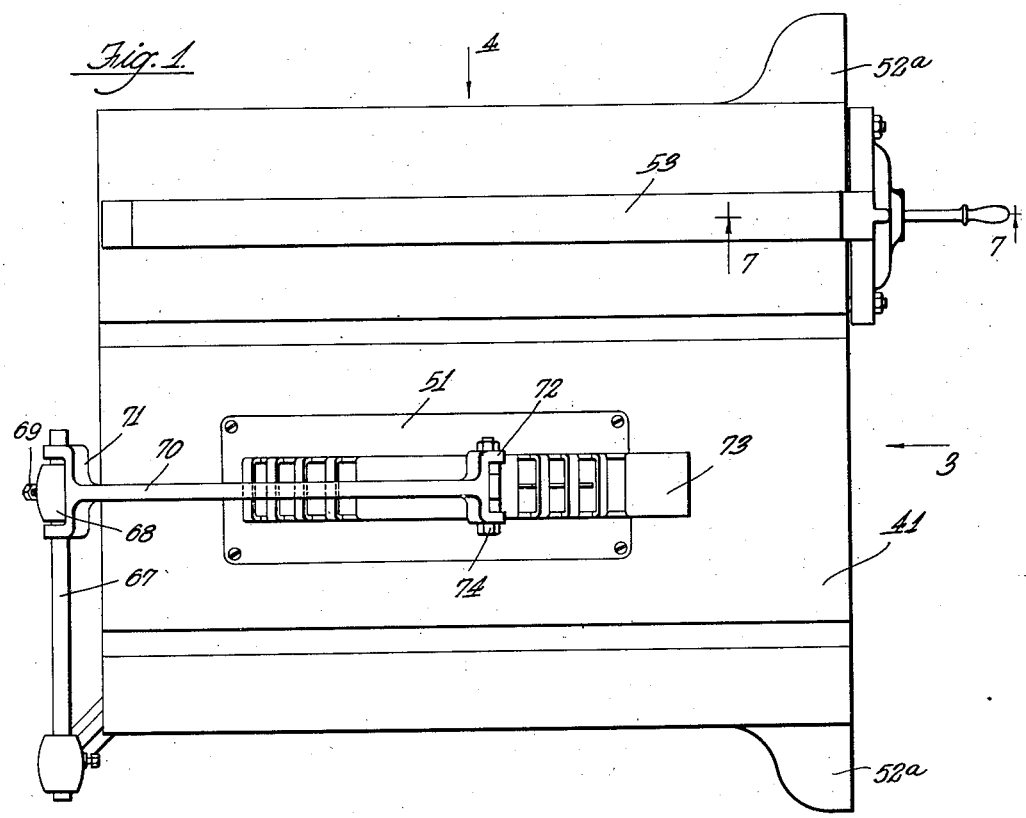
Fig. 1 is a top plan view of the improved circular saw.

Referring to the accompanying drawings, wherein similar reference characters designate similar parts throughout, the improved saw consists of a base preferably rectangular in form having side walls 10 and 11 and end walls 12 and 13. These walls are flanged as indicated at 14, by which flanges the base may be stationarily fastened to a floor or to a work bench. Side 10 has a recess formed in its top indicated at 15 in which is movable a bearing 16 and the circular saw 18 is mounted thereon, the circular saw being disposed within the base. The spindle may carry two or more sheaves 19 and 20 for a drive belt 21, which may be driven from any suitable source of power. The rear end wall 13 has a pair of ears 22 and 23 in which is mounted a pivot pin 24. Two arms 25 and 26 are pivoted on the pivot pin 24 and these arms are connected to or may be made integral with bearing 16. Arm 25 carries a clevised branch 27 in which is rotatably mounted a nut 28. A crank 29 extends through the forward end 12 and has its rear end threaded as indicated at 30 through the nut. This crank may rotate but it is held against longitudinal movement by a collar 31. On rotating crank 29 in one direction the clevised end 27 will be forced rearwardly, causing arm 25 to swing upwardly about pivot pin 24 as a center and thus effect a raising of the saw. Reverse rotation of crank 29 accomplishes a lowering of the saw. Arm 26 has an extension beyond bearing 16 on which is formed an ear 32. A bolt 33 extends through an arcuate slot 34 in side wall 10, through the ear and into a handle 35, which is internally threaded. The head of the bolt bears against the inside of side wall 10. It will be understood that a raising and lowering of the saw by rotating crank 29 is accomplished only when the handle 35 is loosened. When the saw is in adjusted position, the threaded crank extending into the nut 28 is sufficient to hold the saw in this position. However, if it is desired to lock the saw in this adjusted position, handle 35 may be tightened. This arm 26 also may carry a pointer 36 arranged to traverse a graduated scale 37 adjacent the side of slot 34 to serve as an indicator of the height to which the saw has been projected through the table top.

It will be noted that in the above described construction that the bearing 16 is supported by means of two arms which pivot about a common pivot point 24. These two arms prevent the bearing from wobbling or from moving out of its intended plane of movement, with the result that the saw 18 is always rotating in the same plane. Even during adjustment inasmuch as bolt 33 is just loosened, the head of the bolt engaging the inside of wall 10 and ear 32 engaging the outside of wall 10, there is an effective bracing action on the part of the outer end of arm 26 to maintain the bearing in its proper plane. Consequently with the improved construction any tendency on the part of crank 29 to move bearing 16 laterally is effectively prevented.

To effect a simple and advantageous mounting of the table top on the base, the base is provided with two trunnions. These trunnions are indicated at 38 and 39 and are located on the end walls 12 and 13 respectively. The bottoms of these trunnions are slotted as indicated at 40. The table top 41 has formed on the under side thereof semi-circular bearings 42 which rest in the trunnions which are at the ends of the slots 40. Each bearing has a stud 43 and 44 secured rigidly thereto and projecting down through their respective slots 40. Shoes 45 and 46 fit loosely about the studs and have their top surfaces formed to partially enter slots 40. These shoes have cammed lower surfaces complementary to cammed upper surfaces of handled cams 47 and 48 which are also loose on the studs. On rotating the handled cams in the proper direction, the studs will be loosened so that it is possible to tilt the table, the bearings 42 merely sliding on the ends of the trunnions 38 and 39. When the table is in adjusted position, on tightening the handled cams the studs will be tightened and hold the bearings 42 tight against the ends of the trunnions and thus frictionally hold the table top in adjusted position. The shoes 45 and 46 will also be urged into engagement with the bottoms of the trunnions and assist in frictionally holding the table in adjusted position. The forward bearing may carry a pointer 49 arranged to traverse a scale 50 on the forwardmost trunnion 38. A slot is provided in the table top, preferably in a separate plate 51 inserted in the table. As a means for providing an adjustable fence on the table, the table top has a flange 52 formed on the under side of its forward edge. The forward side of this flange is vertical, while the rear side of the flange slopes downwardly and forwardly so that the flange is tapered. The fence comprises a bar 53 which extends from the forward side of the table top rearwardly. At the forward end of this bar there is a downwardly extending extension 54 having laterally extending arms 55 and 56. These arms carry adjustable studs 57 and 58, the rear ends of which engage the forward side of flange 52. The extension 54 has an integral shouldered portion 59 extending down adjacent flange 52. A clamp 60 fits against the shoulder on portion 59 and has a portion 61 fitting against the sloping side of flange 52. A stud 62 extends downwardly from the extension 54 and carries a cam 63 and a handled cam 64. By rotating the handled cam 64 by means of its handle, stud 62 can be loosened and in this condition the fence can be bodily caused to slide across the table to assume the desired position. On turning the handled cam so as to tighten the stud, the fence is drawn downwardly against the top surface of the table. The clamp 60 is urged upwardly and portion 61 is pushed tightly against the tapered surface of flange 52. This tends to draw the entire fence rearwardly until studs 57 and 58 are forced tightly into engagement with the vertical side of flange 52, thus causing the body of the fence 53 to assume a position at exactly right angles to the length of flange 52. In this position the fence will be perfectly parallel to the plane of the saw. In the event the construction is such that flange 52 is not perfectly at right angles to the plane of the saw, the studs 57 and 58 can be so adjusted as to compensate for this, so that regardless of what position the fence may assume on the table, it will always be parallel to the plane of the saw.

Figure 3:
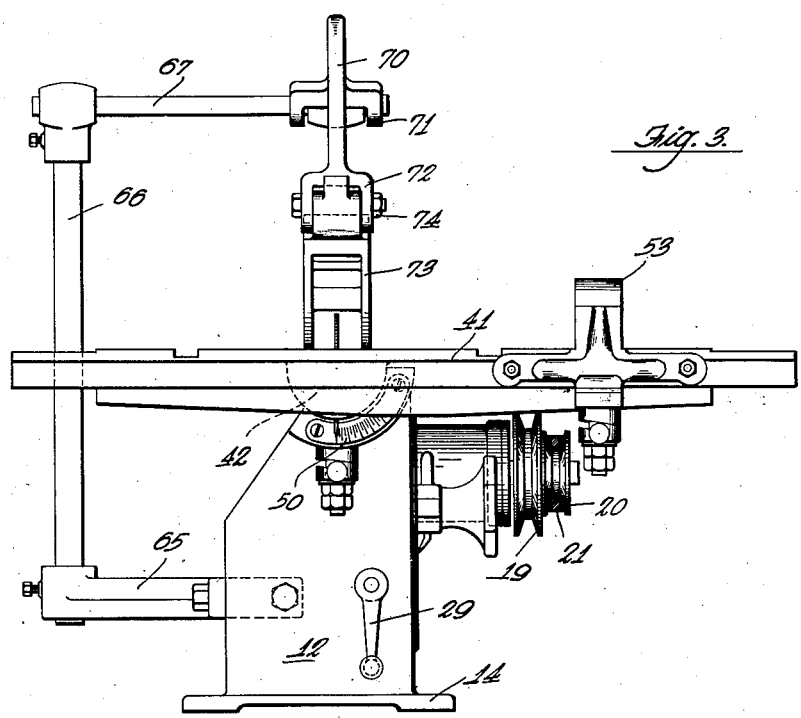
Fig. 3 is a view in front elevation of the saw taken in the direction of the arrow 3 upon Figure 1.
Figure 4:
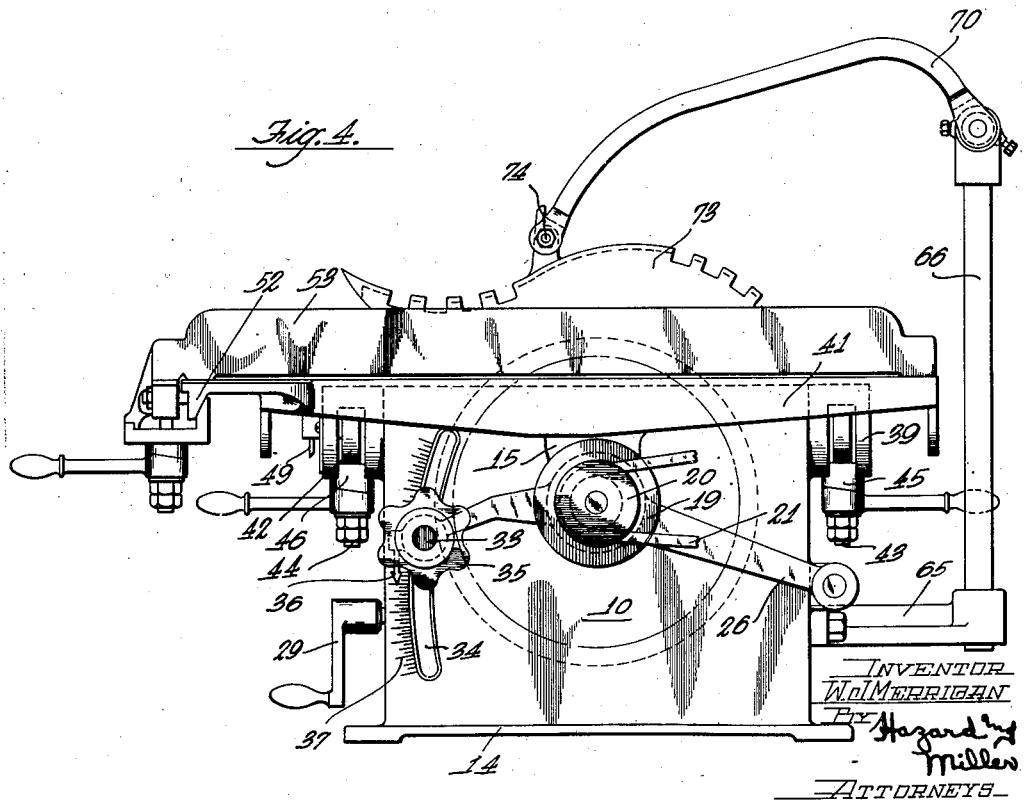
Fig. 4 is a view in side elevation taken in the direction of the arrow 4 upon Figure 1.
Figure 5:
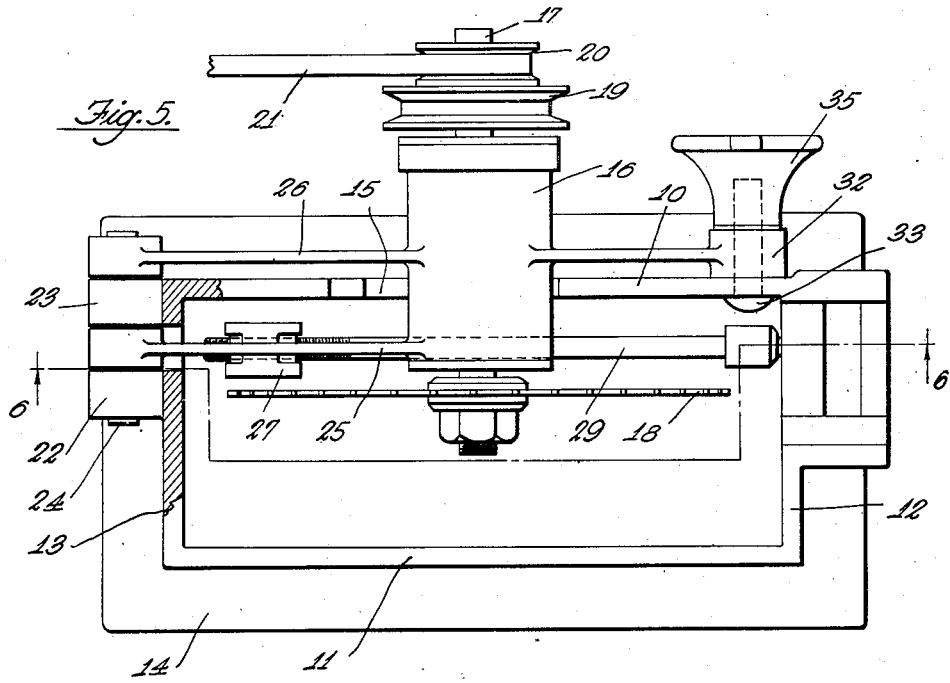
Fig. 5 is a top plan view of the base of the saw, the table top shown as having been removed and parts being broken away and shown in horizontal section.
Figure 6:
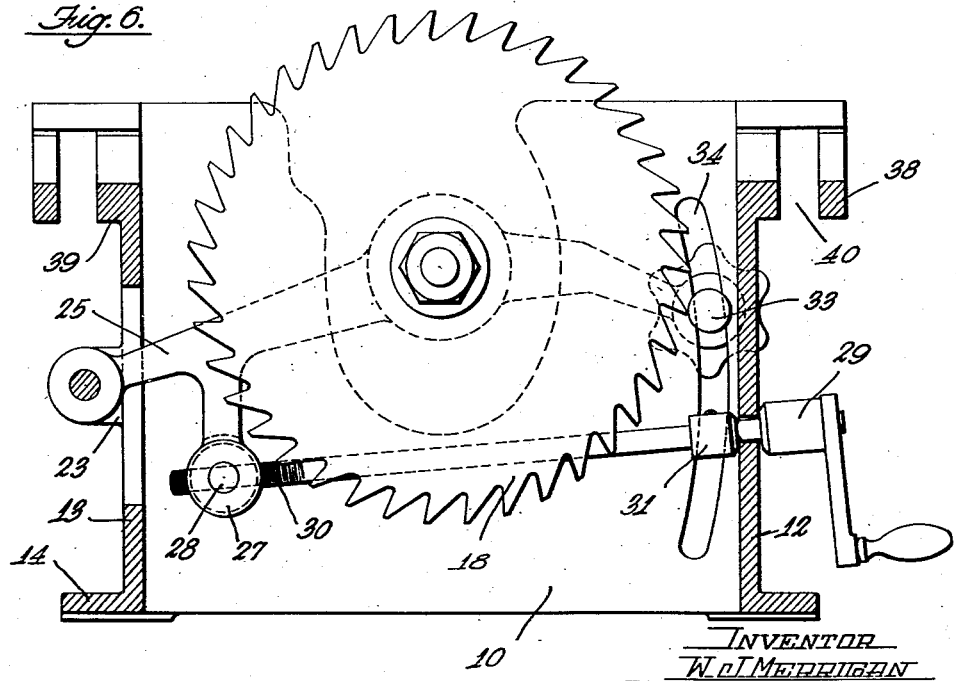
Fig. 6 is a sectional view taken substantially upon the line 6—6 upon Figure 5.
Figure 7:
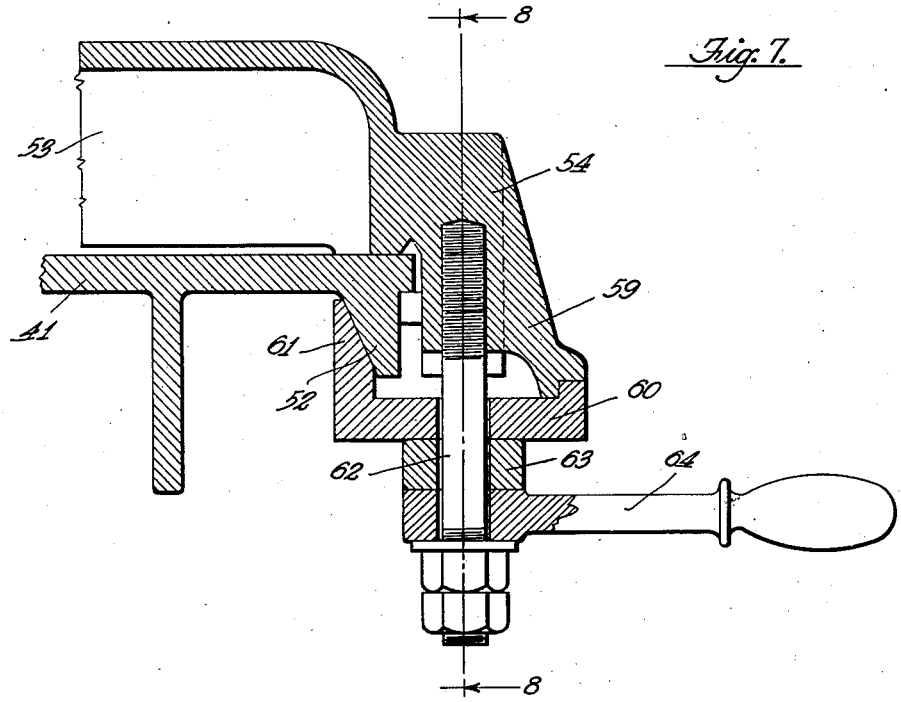
Fig. 7 is a detail in vertical section taken upon the line 7—7 upon Figure 1.
Figure 8:
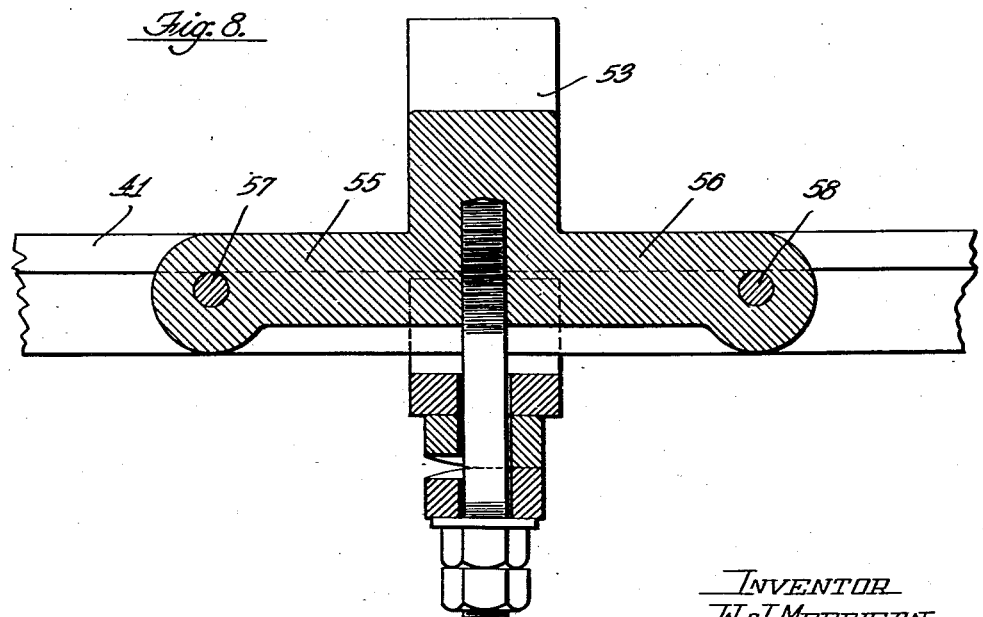
Fig. 8 is a vertical section taken substantially upon the line 8—8 upon Figure 7.

At the ends of the front edge formed by the flange of the table there are disposed laterally extending ears 52a (see Fig. 1). These ears project laterally beyond the sides of the saw table and form extensions extending the surface or forward edge of the table, which is engaged by the studs 57 and 58 beyond the sides of the table. Their top surfaces are relieved (see Figs. 1 and 3), that is, they are disposed a short distance below the top or working surface of the table.

By virtue of the fact that the portions of the fence which engage the flange extend laterally beyond the sides of the fence so as to have a greater leverage in causing the fence to assume a position parallel to the saw in any adjusted position, the presence of these ears forming an extension of the flange or forward edge of the table enables the fence to be moved to the extreme side edge of the table. It will be readily appreciated that if the ears were left off that the extreme positions that could be assumed by the fence would be spaced from the side edges of the table because a stud 57 or 58 would run off of the flange. The presence of the ears enables the fence to be moved in its extreme positions to the side edges of the table.

The purpose of having the top surfaces of the ears relieved is to reduce the amount of grinding or machine work necessary to give the top surface of the table a finished working surface. It is only necessary to machine or grind the rectangular table surface without the ears. The relief is preferably considerable for the reason that these tables are made by casting and there is a tendency for the ears to warp upwardly as the casting cools. Inasmuch as the sole function of the ears is to form an extension for the flange there is no necessity for machining the top surfaces of the ears or in having them flush with the balance of the table.

From the above described construction of fence, it will be appreciated that it is possible to quickly loosen the fence and slide it across the table top without binding. Whenever the fence is tightened up in adjusted position, the tightening involves a drawing of the fence rearwardly until the studs 57 and 58 are drawn into firm engagement with the forward side of flange 52, thus assuring the operator on each setting that his fence will be perfectly parallel to the saw.

Figure 2:
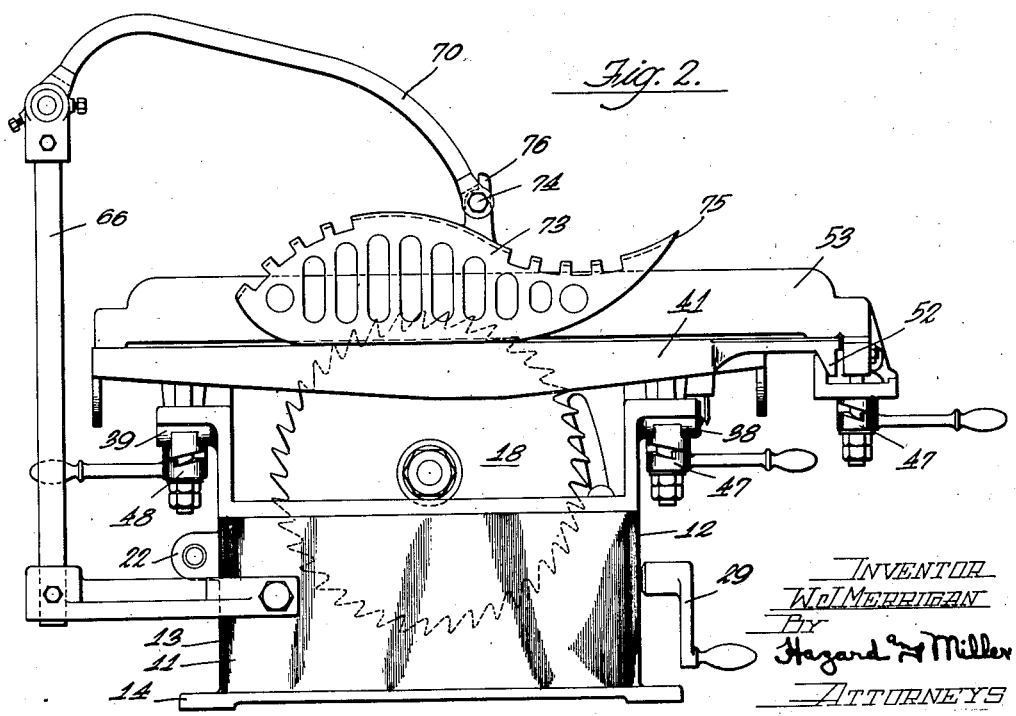
Fig. 2 is a view in side elevation of the same.

A guard is provided for the saw and to this end a bracket 65 is secured to the base, carrying an upstanding rod 66, to which is fastened a horizontal rod 67. On this horizontal rod there is mounted a collar 68 which is fastened in place by means of a set screw 69. The above construction constitutes a standard for an arm 70 which has a clevised end 71 pivoting on horizontal rod 67 on both sides of collar 68. The arrangement is such that set screw 69 is in the path of movement of the top of the clevis and serves to limit upward swinging movement of arm 70. This may be adjusted by merely loosening set screw 69 and rotating the collar about rod 67. The collar may also be caused to slide on rod 67 to any adjusted position that will position arm 70 directly over the saw. The forward end of arm 70 is also clevised as indicated at 72 and the guard 73 is pivotally mounted therein on a bolt 74. This guard is in the form of an inverted channel having approximately the shape shown wherein the forward edges, indicated at 75, are inclined so that the guard will be automatically lifted when material is forced into the saw. The guard carries a finger 76 which engages the top of clevis 72 and limits swinging movement of the guard relatively to the arm 70 in one direction. This is so limited that on lifting the forward end of the guard finger 76 will engage clevis 72 before the rear end of the guard can engage the saw at any normal height. After this engagement, further lifting of the guard merely causes arm 70 to swing about rod 67 as a center. Arm 70, as shown in Figure 2, is bent so that in the event that the guard is swung in a reverse direction about bolt 74, that the rear end of the guard will engage the arm before the forward end of the guard enters the path of the saw. In this way the guard has its pivotal movement limited in both directions so as to prevent any portion of the guard engaging the saw. The construction of guard is such that it properly guards the saw regardless of whether the table top is in horizontal position as shown, or whether the table top is in an inclined or tilted position.

From the above described construction, it will be appreciated that an improved circular saw is provided having many advantageous improvements in its design.

Various changes may be made in the details of construction without departing from the spirit or scope of the invention as defined by the appended claims.

I claim:

1. In a woodworking machine having a table, a downwardly extending flange disposed adjacent an edge of the table, said flange presenting a downwardly and outwardly inclined surface on its inner side, a fence resting on said table having an overhanging portion extending outwardly beyond said edge, a spanning member engaging said inclined surface and the overhanging portion of the fence, and means secured to the overhanging portion for tightening the spanning member upwardly against said surface and simultaneously tightening the fence downwardly against the table.

2. In a woodworking machine having a table, a downwardly extending flange disposed adjacent an edge of the table, said flange presenting a downwardly and outwardly inclined surface on its inner side, a fence resting on said table having an overhanging portion extending outwardly beyond said edge, a spanning member engaging said inclined surface and the overhanging portion of the fence, and means secured to the overhanging portion for tightening the spanning member upwardly against said surface and simultaneously tightening the fence downwardly against the table, said spanning member where it engages the inclined surface presenting a surface complementary thereto.

3. In a woodworking machine having a table, a downwardly extending flange disposed adjacent an edge of the table, said flange presenting a downwardly and outwardly inclined surface on its inner side, a fence resting on said table having an overhanging portion extending outwardly beyond said edge, a spanning member engaging said inclined surface and the overhanging portion of the fence, the engagement between the spanning member and the overhanging portion being such as to enable the spanning member to force the overhanging portion against said edge when the spanning member is tightened upwardly, and means secured to the overhanging portion and extending downwardly through the spanning member for tightening the spanning member upwardly against said surface and simultaneously tightening the fence downwardly against the table.

4. In a woodworking machine having a table, a downwardly extending flange disposed adjacent an edge of the table, said flange presenting a downwardly and outwardly inclined surface on its inner side, a fence resting on said table having an overhanging portion extending outwardly beyond said edge, a spanning member engaging said inclined surface and the overhanging portion of the fence, and means secured to the overhanging portion for tightening the spanning member upwardly against said surface and simultaneously tightening the fence downwardly against the table, said overhanging portion being engageable with said edge so that tightening of the spanning member will simultaneously crowd said overhanging portion against the edge.

5. In a woodworking machine, a table having a downwardly extending flange adjacent an edge, a fence resting on the table having a portion overhanging said edge, a spanning member engaging the flange and the overhanging portion, the engaging surfaces between the spanning member, the flange, and the overhanging portion being so arranged as to crowd the overhanging portion against said edge on tightening the spanning member upwardly, and means connected to the fence for tightening the spanning member upwardly against said flange.

6. In a woodworking machine, a table having a downwardly extending flange adjacent an edge, a fence resting on the table having a portion overhanging said edge, a spanning member engaging the flange and the overhanging portion, and means connected to the fence for tightening the spanning member upwardly against said flange, at least one of the surfaces in engagement between the flange and spanning member being inclined so that tightening of the spanning member will simultaneously crowd the overhanging portion of the fence against said edge.

7. In a woodworking machine, a table having a downwardly extending flange adjacent an edge, a fence resting on the table having a portion overhanging said edge, a spanning member engaging the flange and the overhanging portion, and means connected to the fence for tightening the spanning member upwardly against said flange, at least one of the surfaces in engagement between the flange and spanning member being inclined so that tightening of the spanning member will simultaneously crowd the overhanging portion of the fence against said edge, and adjustable studs on the overhanging portion engageable with said edge on opposite sides of the spanning member and tightening means.

8. In a woodworking machine having a table, a downwardly extending flange disposed adjacent an edge of the table, a fence resting on the table having an overhanging portion extending beyond said edge, a spanning member engaging the overhanging portion and the inner side of said flange, tightening means connecting the overhanging portion and the spanning member which tightens the spanning member upwardly against the flange and also tightens the fence downwardly against the table top, at least one of the surfaces of engagement between the flange and spanning member being downwardly and outwardly inclined so that tightening of the tightening means is effective to tighten the overhanging portion laterally against said edge.

WM. J. MERRIGAN.